US011971887B2

United States Patent
Popescu et al.

(10) Patent No.: US 11,971,887 B2
(45) Date of Patent: Apr. 30, 2024

(54) IDENTIFYING AND REPLACING LOGICALLY NEUTRAL PHRASES IN NATURAL LANGUAGE QUERIES FOR QUERY PROCESSING

(71) Applicant: INTERNATIONAL BUSINESS MACHINES CORPORATION, Armonk, NY (US)

(72) Inventors: Octavian Popescu, Katonah, NY (US); Vadim Sheinin, Yorktown Heights, NY (US); Ngoc Phuoc An Vo, Bronx, NY (US); Elahe Khorasani, Yorktown Heights, NY (US); Hangu Yeo, Baldwin Place, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 285 days.

(21) Appl. No.: 17/656,690

(22) Filed: Mar. 28, 2022

(65) Prior Publication Data
US 2023/0306022 A1    Sep. 28, 2023

(51) Int. Cl.
*G06F 40/30* (2020.01)
*G06F 16/2452* (2019.01)
*G06F 40/205* (2020.01)

(52) U.S. Cl.
CPC ...... *G06F 16/24522* (2019.01); *G06F 40/205* (2020.01); *G06F 40/30* (2020.01)

(58) Field of Classification Search
CPC ... G06F 16/24522; G06F 40/205; G06F 40/30
See application file for complete search history.

(56) References Cited

U.S. PATENT DOCUMENTS

| 2015/0331850 A1* | 11/2015 | Ramish ............... G06F 40/40 704/9 |
| 2018/0150552 A1* | 5/2018 | Wang ................. G06N 20/20 |
| 2020/0034420 A1 | 1/2020 | Ferrucci |

FOREIGN PATENT DOCUMENTS

WO    2015012679 A2    1/2015

OTHER PUBLICATIONS

Affolter, et al., "A Comparative Survey of Recent Natural Language Interfaces for Databases", The VLDB Journal (2019), pp. 793-819, Aug. 28, 2019. https://doi.org/10.1007/s00778-019-00567-8.

(Continued)

*Primary Examiner* — Ibrahim Siddo
(74) *Attorney, Agent, or Firm* — Daniel G. DeLuca

(57) ABSTRACT

An embodiment for identifying and replacing logically neutral phrases in natural language queries may include receiving a natural language query. The embodiment may also identify one or more logically neutral or non-logically neutral anchors in the natural language query. The embodiment may also identify boundaries containing one or more logically neutral phrases. The embodiment may further include detecting semantic and logical relations between verbal phrases and functional language between and adjacent to the one or more logically neutral and non-logically neutral anchors to reintroduce non-logically neutral language back into a non-logically neutral portion of the natural language query. The embodiment may also include generating a modified natural language query by automatically removing the boundaries and optionally replacing the one or more logically neutral phrases in the natural language query. The embodiment may further include providing the modified natural language query to a query processing system for further processing.

20 Claims, 6 Drawing Sheets

(56) References Cited

OTHER PUBLICATIONS

Mell et al., "The NIST Definition of Cloud Computing", Recommendations of the National Institute of Standards and Technology, NIST Special Publication 800-145, Sep. 2011, 7 pages.

* cited by examiner

IDENTIFYING AND REPLACING LOGICALLY NEUTRAL PHRASES IN NATURAL LANGUAGE QUERIES FOR QUERY PROCESSING

BACKGROUND

The present application relates generally to the field of computing, and more particularly to a natural language processing system for identifying and replacing logically neutral phrases in a natural language query for query processing.

Structured Query Language (SQL) is a standard query language to retrieve information stored in relational databases. Common Relational Database Management Systems (RDBMS) use SQL and have their own proprietary extensions. Hence, users need to learn the query language and be familiar with the database management system and database schema to formulate the query to produce the desired output query results. Natural Language Processing (NLP) is a field of computer science, artificial intelligence, and linguistics concerned with the interactions between computers and human (natural) languages. A user having no technical background benefits greatly from having the ability to query a database using natural language queries.

SUMMARY

According to one embodiment, a method, computer system, and computer program product for identifying and replacing logically neutral phrases in natural language queries is provided. The embodiment may include receiving a natural language query. The embodiment may also include automatically identifying one or more logically neutral and non-logically neutral anchors in the natural language query. The embodiment may also include automatically identifying boundaries containing one or more logically neutral phrases by detecting semantic and logical relations between verbal phrases and functional language between and adjacent to the one or more logically neutral and non-logically neutral anchors to reintroduce non-logically neutral language back into a non-logically neutral portion of the natural language query. The embodiment may further include generating a modified natural language query by automatically removing the boundaries containing the one or more logically neutral phrases and optionally replacing the one or more logically neutral phrases in the natural language query. The embodiment may also include providing the modified natural language query to a query processing system for further processing.

BRIEF DESCRIPTION OF THE SEVERAL VIEWS OF THE DRAWINGS

These and other objects, features and advantages of the present disclosure will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
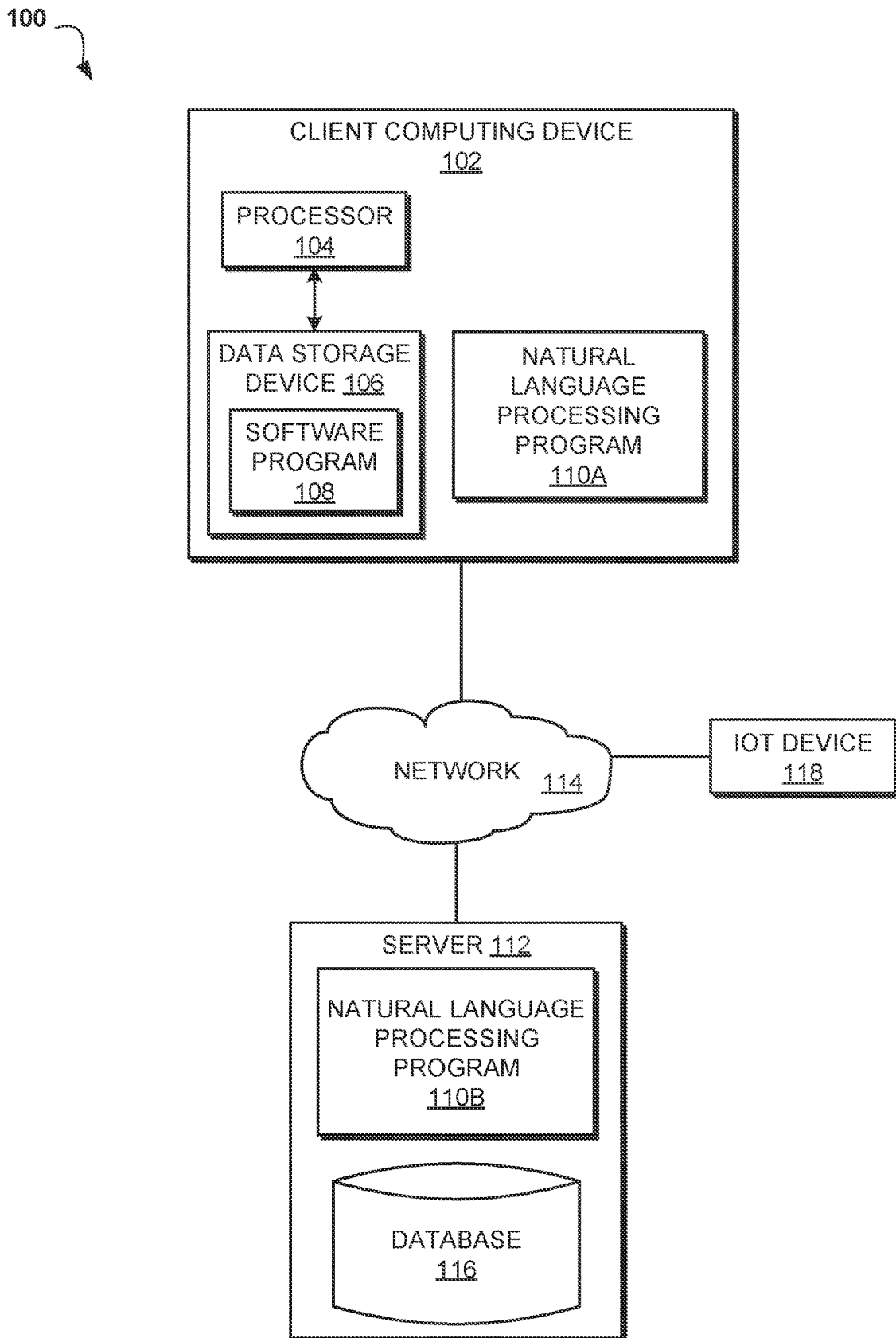
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. The present disclosure may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present application relate to the field of natural language processing, and more particularly to a system for identifying and replacing logically neutral phrases in natural language queries to improve and facilitate a conversion of natural language queries into structured query language (SQL) as well as improve processability when querying a database using a natural language query. The following described exemplary embodiments provide a system, method, and program product to, among other things, receive a natural language query, identify logically neutral phrases in the natural language query, and then determine suitable replacement language to improve processability of a resulting query generated from the natural language query. Therefore, the present embodiment has the capacity to improve natural language processing technology by automatically removing logically neutral phrases to transform unprocessable or inaccurate natural language queries into modified natural language queries that a system can easily transform into a processable and accurate SQL query.

As previously described, Structured Query Language is a standard query language to retrieve information stored in relational databases. Common Relational Database Management Systems use SQL and have their own proprietary extensions. Hence, users need to learn the query language and be familiar with the database management system and database schema to formulate the query to produce the desired output query results. It is often challenging for non-technical end users to query relational databases without being trained technically. Therefore, many systems aim to convert Natural Language Queries (NLQ) into SQL queries to provide a more user-friendly experience.

Generally, people use natural language to communicate and ask questions in the real world. Natural Language Processing (NLP) is a field of computer science, artificial intelligence, and linguistics concerned with the interactions between computers and human (natural) languages. As such, NLP is often involved with natural language understanding, i.e., enabling computers to derive meaning from human or natural language input, and natural language generation.

While some systems convert natural language queries to SQL queries, unknown phrases or extraneous words from an original natural language query often remain a part of a final transformed query. This can lead to incorrect queries, inaccurate query outputs, or a query that is unable to be processed at all. Often, systems designed to facilitate conversion of NLP into SQL utilize word-based approaches to identify language that risks negatively impacting the processability or accuracy of a given query. However, word-based approaches often fail to remove certain undesirable words or phrases, especially if certain phrases are capable of being logically neutral or non-logically neutral depending on the surrounding language. Illustrative embodiments described herein utilize an analytical approach rooted in semantic and logical analysis to modify a received query by determining which language in a received query is logically neutral and should therefore be removed or replaced.

According to at least one embodiment, when a user inputs a natural language query into a computer system capable of employing methods in accordance with the present invention, the method, system, computer program product may automatically identify one or more logically neutral and non-logically neutral anchors in the natural language query. The method, system, computer program product may then automatically identifying boundaries containing one or more logically neutral phrases by detecting semantic and logical relations between verbal phrases and functional language between and adjacent to the one or more logically neutral and non-logically neutral anchors to reintroduce non-logically neutral language back into a non-logically neutral portion of the natural language query. Next, the method, system, computer program product may generate a modified natural language query by automatically removing the boundaries containing the one or more logically neutral phrases and optionally replacing the one or more logically neutral phrases in the natural language query. According to one embodiment, the method, system, computer program product may then provide the modified natural language query to a query processing system for further processing. In turn, the resulting modified natural language query will be free of logically neutral phrases and may be suitable for conversion into a further processed logical form that is easily transformable into a fully processable SQL query that may be subsequently used to query a database.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to identify and replace logically neutral phrases in natural language queries to improve and facilitate the subsequent conversion and processability of a given natural language query.

Referring to FIG. 1, an exemplary networked computer environment 100 is depicted, according to at least one embodiment. The networked computer environment 100 may include client computing device 102, a server 112, and Internet of Things (IoT) Device 118 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a natural language processing program 110A and communicate with the server 112 and IoT Device 118 via the communication network 114, in accordance with one embodiment of the present disclosure. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running a natural language processing program 110B and a database 116 and communicating with the client computing device 102 and IoT Device 118 via the communication network 114, in accordance with embodiments of the present disclosure. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

IoT Device 118 may be a mobile device, a voice-controlled personal assistant, and/or any other IoT Device 118 known in the art for receiving queries that is capable of connecting to the communication network 114, and transmitting and receiving data with the client computing device 102 and the server 112.

According to the present embodiment, the natural language processing program 110A, 110B may be a program capable of automatically receiving a natural language query and identifying one or more logically neutral and non-logically neutral anchors in the natural language query. Natural language processing program 110A, 110B may then automatically identify boundaries containing one or more logically neutral phrases by detecting semantic and logical relations between verbal phrases and functional language between and adjacent to the one or more logically neutral and non-logically neutral anchors to reintroduce non-logically neutral language back into a non-logically neutral portion of the natural language query. Next, natural language processing program 110A, 110B may then generate a modified natural language query by automatically remove the boundaries containing the one or more logically neutral phrases and optionally replacing the one or more logically neutral phrases in the natural language query. Finally, natural language processing program 110A, 110B may provide the modified natural language query to a query processing system for further processing. In turn, the resulting modified natural language query will be free of logically neutral phrases and may be suitable for conversion into a further processed logical form that is easily transformable into a fully processable SQL query that may be subsequently used to query a database.

Figure 2:
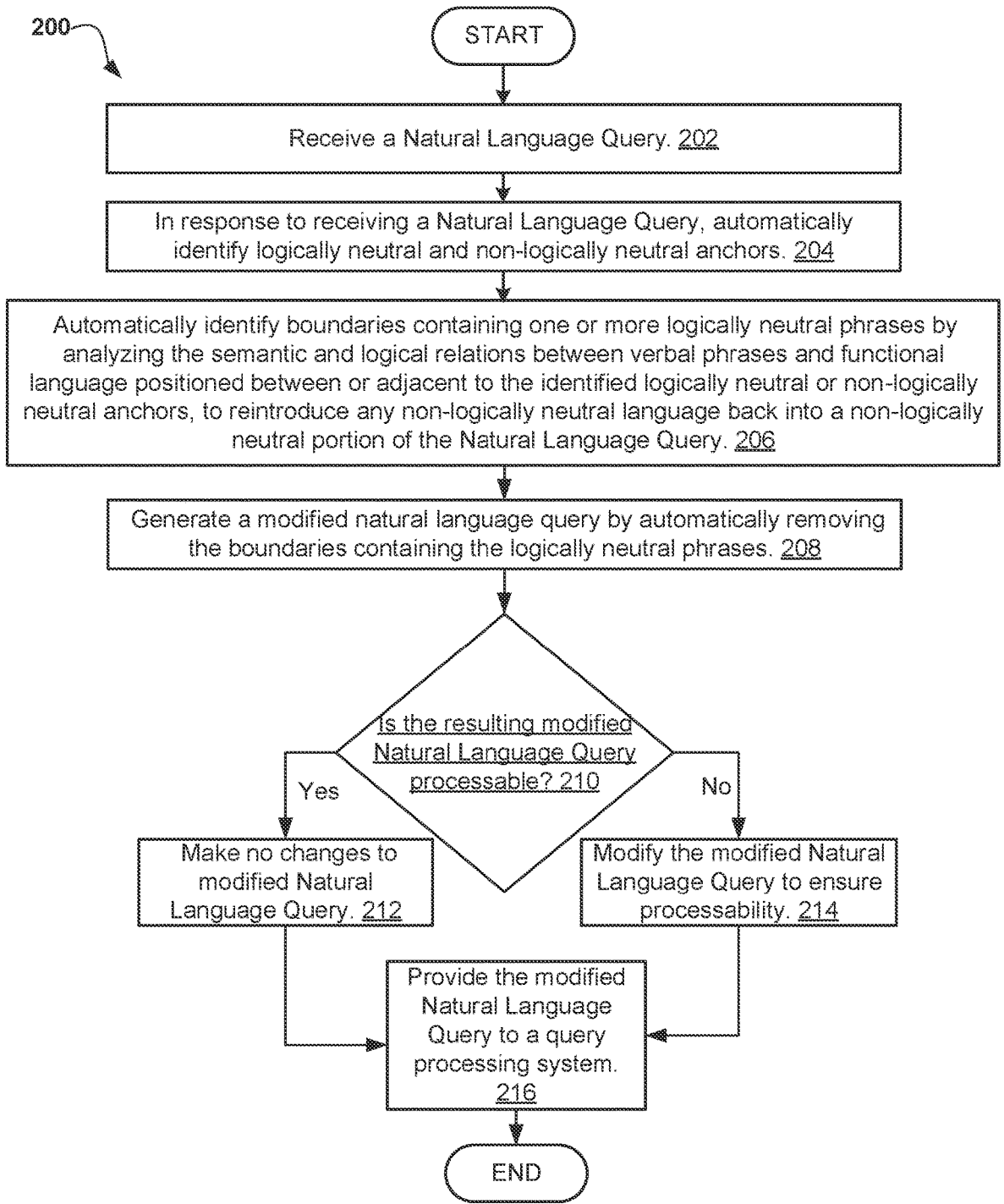
FIG. 2 illustrates an operational flowchart for identifying and replacing logically neutral phrases in natural language queries according to at least one embodiment.

Referring now to FIG. 2, an operational flowchart for identifying and replacing logical neutral phrases in a natural language query process 200 is depicted according to at least one embodiment. At 202, the natural language processing program 110A,110B receives a natural language query. The received natural language query may be input into the program via typing, spoken word, or any other suitable mechanism of inputting a natural language query into processing program 110A, 110B. The natural language query may be in the form of a statement or a question. For example, a given user may input 'I would like to know where Shop X is located" or "Could you please tell me the salary of Employee X?"

At 204, the natural language processing program 110A, 110B 110A, 110B identifies logically neutral and non-logically neutral anchors contained in a natural language query. According to one embodiment, the natural language processing program 110A, 110B identifies the anchors in a given natural language query by comparing the nouns or pronouns contained in a given query to a schema annotation file (SAF). In the context of this disclosure, an anchor is a word or phrase that natural processing program 110A, 110B may use as a reference point for each micro-analysis performed by the program as a part of a comprehensive analysis used to resolve a received natural language query. Initially, the natural language processing program 110A,110B may categorize all nouns or pronouns in the natural language query having matches found in the SAF as anchors or heads of non-logically neutral phrases. Furthermore, the natural language processing program 110A,110B may initially categorize any remaining nouns or pronouns as heads of logically neutral phrases. However, pronouns may be further analyzed by Natural language processing program 110A, 110B and reconsidered to determine if they ultimately remain a LNP or are reconsidered as a non-LNP. This is because Natural language processing program 110A, 110B uniquely recognizes that certain pronouns may be logically neutral or non-logically neutral depending upon the semantic and logical relations between the pronoun and the language surrounding it. This analysis and the role of the anchors will be further described below in connection with step 204 in FIG. 2.

A SAF typically describes, in natural language, relations between tables and columns of a specific database, thereby specifying a type of relationship that entities have with each other. Often, the explicit nature of the relationship between entities is provided by experts with a deep knowledge of the underlying database structure and ontology. For example, in traditional approaches, creating a schema annotation file is performed by a user having knowledge of the database structure and ontology as well as the schema annotation file structure and supported formats of the phrases and the flag statements used to create the schema annotation file.

Figure 3:
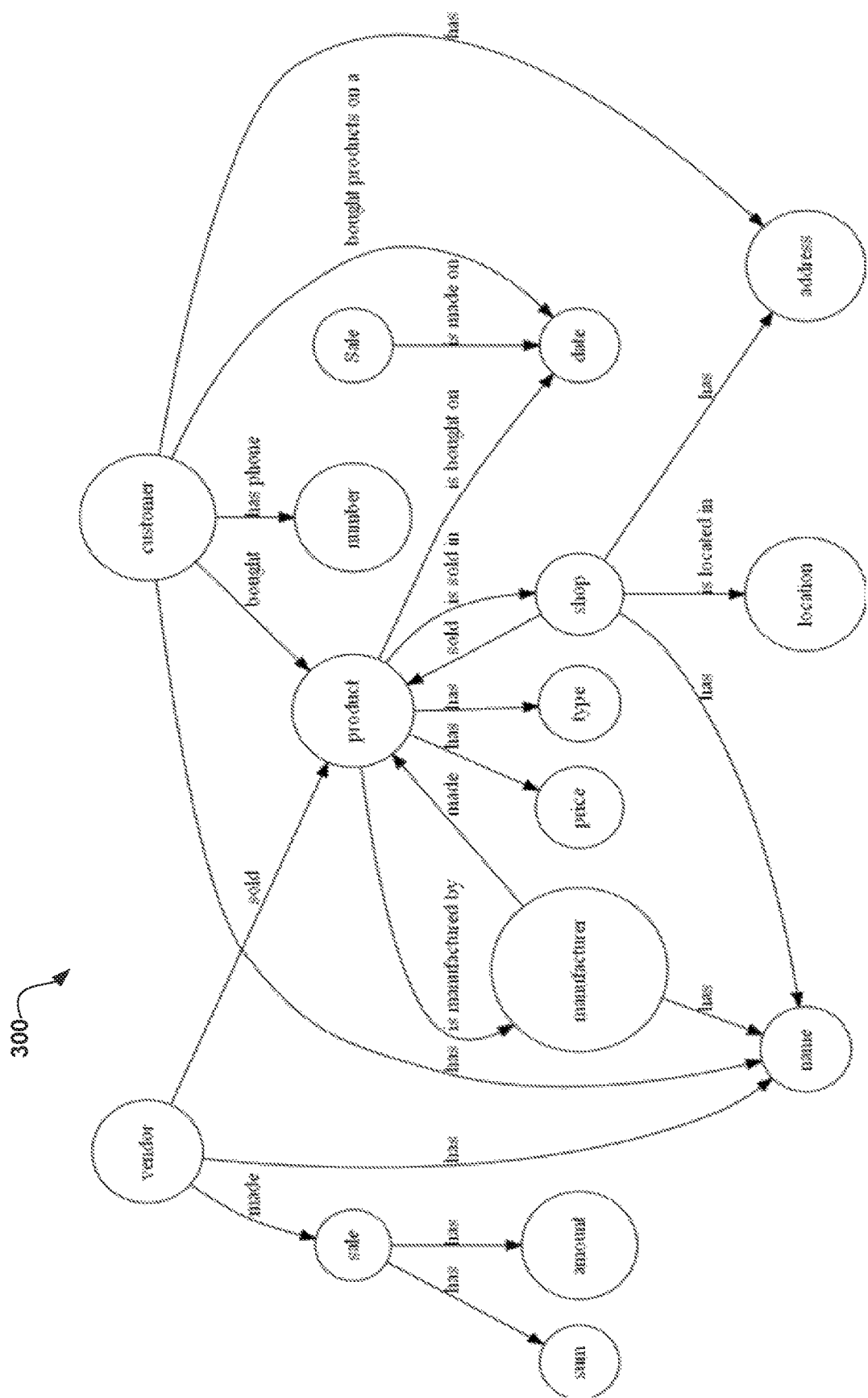
FIG. 3 illustrates an exemplary schema annotation file of a database according to at least one embodiment.

According to one embodiment, the SAF used by the natural language processing program 110A, 110B can interpret the language of a received natural language query and extract key concepts and values and relate the concepts to the database schema. Also, according to one embodiment, the SAF used by the natural language processing program 110A, 110B may be made by using an automated schema annotation file creation method. FIG. 3 depicts an exemplary portion of a schema of an illustrative SAF 300 used by the natural language processing program 110A, 110B. As shown in the illustrative example shown in FIG. 3, a given substantial word such as 'Vendor' may have a direct match in the SAF 300, indicated by any word contained in a circle. Nouns that contain a direct match in the SAF 300 are categorized by the natural language processing program 110A, 110B as non-logically neutral phrases (Non-LNP) and may be considered heads or anchors of non-logically neutral phrases.

The SAF 300 further contains words or phrases that may be directly related to or auxiliary to the non-LNP anchors. For example, in FIG. 3 'Vendor' may be related to the words 'made', 'has', and 'sold'. How the natural language processing program 110A, 110B uses these types of logical and semantic relations between words will be explained in more detail below. Again, the natural language processing program 110A,110B may categorize all nouns in the received natural language query that have matches found in the SAF as heads or anchors of non-logically neutral phrases while the natural language processing program 110A,110B may initially categorize the remaining nouns as heads of the logically neutral phrases.

Next, at 206, the natural language processing program 110A, 110B automatically identifies the boundaries containing logically neutral phrases. In the context of this disclosure, a boundary includes all logically neutral language to the left or right of the non-logically neutral language of a received natural language query. The natural language processing program 110A, 110B may link all closed class words that could define a left boundary of a noun phrase to a corresponding non-logically neutral anchor in the SAF. In the context of this disclosure, closed class words may refer to the category of function words—that is, parts of speech (or word classes)—that do not readily accept new members. The closed classes in English may include pronouns, determiners, articles, conjunctions, adverbs, and prepositions. In contrast, open class words include nouns, and lexical verbs. If a closed class word is linked to a noun that is a logically neutral phrase (LNP), then that closed class word is also a LNP. Language between two non-LNP heads are also considered non-LNP. All remaining nouns or pronouns with no match in SAF are initially considered to be logically neutral phrases. However, natural language processing program 110A, 110B will ultimately reconsider portions of a natural language query to accurately detect which language is non-logically neutral and which language is part of one or more boundaries containing logically neutral language to be removed and optionally replaced if needed for processability of the received natural language query.

There are four different scenarios detectable by natural processing program 110A, 110B when identifying the presence of boundaries including logically neutral language. Natural language processing program 110A, 110B determines the boundaries including logically neutral language by analyzing the semantic and logical relations between language adjacent to and between successive anchors that are logically neutral or non-logically neutral. This allows natural processing program 110A, 110B to systematically reconsider language that should be recategorized as non-logically neutral to ultimately isolate all logically neutral language in the boundaries as it resolves a received natural language query.

In a first scenario, natural processing program 110A, 110B may identify a first anchor that is logically neutral and a second successive anchor that is also logically neutral. In this scenario, natural language processing program 110A, 110B may consider all of the words between each logically neutral anchor to be logically neutral. Natural language processing program 110A, 110B may then analyze any language to the left or right of each logically neutral anchor where appropriate to resolve the query. If the remaining language in the query contains only logically neutral language, then the query may be discarded as unprocessable.

In a second scenario, natural processing program 110A, 110B may identify a first anchor that is non-logically neutral and a second successive anchor that is logically neutral. In this scenario, natural language processing program 110A, 110B may analyze the language to the left and right of the first non-logically neutral anchor to further categorize the surrounding language as logically neutral or non-logically neutral.

In a third scenario, natural language processing program 110A, 110B may identify a first logically neutral anchor and a second successive non-logically neutral anchor. In this scenario, natural language processing program 110A, 110B may analyze the language to the left and right of the second non-logically neutral anchor to further categorize the surrounding language as logically neutral or non-logically neutral.

In a fourth scenario, natural language processing program 110A, 110B may identify a first anchor that is non-logically neutral and a second anchor that is also non-logically neutral. In this scenario, natural language processing program 110A, 110B may leave the surrounding language unmodified as it assumes that the query is self-contained. In other words, natural language processing program 110A, 110B analyzes language to the left and right of the anchors when logically neutral anchors are detected. If the received natural language query has only non-logically neutral anchors, the query may be further processed as-is without being acted upon by natural language processing program 110A, 110B.

In each scenario in which natural language processing program 110A, 110B detects a logically neutral anchor, natural language processing program 110A, 110B may analyze language to the left and right side of the anchors to determine if any non-logically neutral language should be reconsidered. As language is reconsidered as a non-LNP, that reconsidered language may serve as a new non-LNP anchor for continued systematic analysis of the query. This process will be further described below.

For example, in the query—'I would like to know how I am evaluated on my role, because I forgot to ask last time"—the natural language processing program 110A, 110B may identify the words "I", "I" "Role" "I" and "Time" as anchor words, with "Role" being the only anchor categorized as a non-LNP anchor based on a match in the SAF. Natural language processing program 110A, 110B may categorize the remaining nouns and pronouns as potentially logically neutral. However, "I" is understood by natural language processing program to be a word that is capable of being logically neutral, or non-logically neutral. Therefore, natural language processing program 110A, 110B may analyze the semantic and logical relations between the anchors "I" and the surrounding words to determine whether they may be considered as a LNP or non-LNP anchor. From left to right, the first "I" and the second "I" are both anchors that must be analyzed to determine whether they are neutral. Accordingly, natural language program 110A, 110B may look left of the first "I" and determine that there is no language there to analyze. Next, natural language program 110A, 110B, may analyze the language to the right of the first "I" until it runs into the phrase "would like" and the word "know". Natural language processing program 110A, 110B ultimately concludes through semantic and logical analysis that the phrase "would like" is most likely an LNP phrase that is associated with the first "I", while "to know" is a verb phrase associated with the LNP to its left. Natural language program 110A, 110B may make conduct this semantic and logical analysis by utilizing a probabilities analysis extracted from a large corpus. In embodiments, natural language program 110A, 110B may further utilize a scoring system, analyzing a list of potentially related words, and then determining a suitable match based on a word having a highest percentage score based on the corpus. At this point in the analysis, natural language program 110A, 110B has determined that "I would like to know" is part of a logically neutral boundary on the left side of the received natural language query, with "know" as an LNP anchor on the right side of the boundary. Next, natural language processing program 110A, 110B may make a similar determination regarding the logically neutral anchors "I" and "Time", being the fourth and fifth anchors respectively from left to right, resulting in a determination that "because I forgot to ask last time" is a logically neutral boundary on the right side of the received natural language query.

Next, natural language processing program 110A, 110B may analyze the semantic and logical relations between the language between and adjacent to the remaining anchors to ensure that non-logically neutral phrases are reconsidered where appropriate. Because the remaining three anchors, namely the second and third "I", and the non-LNP anchor "role" are all either non-LNP, or potentially non-LNP, natural language program 110A, 110B may analyze the remaining language. To do this, natural language processing program 110A, 110B may first detect any semantic and logical relations between words to the left or right of the right-most non-LNP anchor "role". In this example, the left anchor of the right boundary "because" is determined by natural language program 110A, 110B to be a verb associated with the LNP on the right side of the received natural language query. Thus, natural language program 110A, 110B may confirm that "because" should remain categorized as a LNP and will constitute the left-most word of the right side boundary. Next, natural language program 110A, 110B may determine that the word "evaluated" to the left of "role" is semantically and logically most likely to be a verb associated with the word "Role" having a match in the SAF. Thus, "evaluated" is reconsidered as a non-LNP anchor, and the words "on my" are also considered as a non-LNP as they are positioned between two non-LNP anchors. Because all of the language to the right of "role" has been confirmed as logically neutral, natural language processing program 110A, 110B may continue to analyze right-to-left to resolve the remaining language in the query, using "evaluated" as the new left-most non-LNP anchor.

Then, natural language processing program 110A, 110B analyzes the phrase "I am" between the second LNP "I" and the new left-most non-LNP anchor "evaluated". In this case, natural language processing program 110A, 110B determines that the "am" is auxiliary to the non-LNP head "evaluated", and should accordingly be reconsidered as non-LNP. This results in natural language processing program 110A, 110B reconsidering the "I" to the left of "am" as a non-LNP as well, since it is modifying and related to the non-LNP word "am". As described above, natural language processing program 110A, 110B may make these determination based on probabilities extracted from a corpus. This may include analyzing a list of potentially related words, and then determining a suitable match based on a word having a highest percentage score based on a corpus. Accordingly, natural language processing program 110A, 110B may determine words that are non-logically neutral based on semantic and logical relations and tendencies or likelihoods for certain words or phrases to be related. In the example above, the score for the word "am" is highest with respect to its relation to the non-logically neutral head "evaluated". Accordingly, natural language processing program 110A, 110B would determine that "am" should be reconsidered as a non-LNP because it is auxiliary for the non-LNP head "evaluated". This demonstrates the ability of the natural language processing program 110A, 110B to overcome the typical problems of a conventional word-based approach to language processing solutions. The word 'I' in this language natural query is present multiple times. The first 'I' is logically neutral. However, the second 'I', positioned further to the right, has been analyzed by natural language processing program 110A, 110B, and is accordingly reconsidered as a non-LNP based upon semantic and logical relations of the words rooted in probabilities extracted from a corpus. Because the second 'I' is adjacent to a functional verb that is related to a non-LNP head, the second 'I' is reconsidered by natural language processing program 110A, 110B as a non-LNP and remains in the natural language query.

Finally, natural language program 110A, 110B, now considering the second "I" as a left-most non-LNP anchor, may reconsider the LNP "to know" to the left of the second "I". Natural language program 110A, 110B may also confirm that the verbal phrase "to know" is associated with the logically neutral language in the left boundary "I would like, and therefore remains a LNP that is not associated with the second "I". At this point, natural language program 110A, 110B has resolved the boundaries of this exemplary query, determining that "I would like to know" constitutes the left side logically neutral boundary, and that "because I forgot to ask last time" constitutes the right side logically neutral boundary.

At 208, the natural language processing program 110A, 110B may now remove the left and right boundaries that have been categorized as logically neutral phrases to generate a modified natural language query.

Finally, at 210, natural language processing programs 110A, 110B determines if the resulting modified natural language query, now having the logically neutral phrases removed, is processable. If the modified natural language query is not in the form of a question, (i.e. does not contain a question or 'wh' word, such as 'who', 'what, 'where', 'when' etc.) then natural language processing program 110A, 110B may search the SAF for an explicit relations match for the non-LNP language in the query. Natural language processing program 110A, 110B may also determine if the query is lacking a suitable verb. At 214, the natural language processing program 110A, 110B may then replace the removed Logically Neutral Phrases with a match found in SAF to complete the query with a suitable word to form a processable question. For example, if the natural language query input into processing program 110A, 110B is 'I would like to know the price of a laptop in Store X', the remaining language after removing the logically neutral phrases is 'price of a laptop in Store X'. Natural language processing program 110A, 110B may analyze the remaining query and determine that it is not a processable question, and is also lacking a verb. Next, natural language processing program 110A, 110B may look at the non-LNP words in the query that have a direct match in the SAF—in this case 'Price', 'Laptop' and 'Store'—and may determine a suitable phrase to replace the removed logically neutral phrases with in order to make the query a processable question. In this case, the natural language processing program 110A, 110B could analyze the SAF using a corpus or machine learning to determine that 'What is' is the most likely phrase to complete this query in order to have a processable and accurate query. This may be determined by natural language processing program 110A, 110B similarly to the semantic and logical relation analysis above, through the use of a score-based probability system. Natural language processing program 110A, 110B would accordingly add the 'What is' in place of the removed logically neutral phrases to make the final query read "What is the price of a laptop in store X?"

According to one embodiment, natural language processing program 110A, 110B, when unable to locate a suitable match in the SAF to complete an unprocessable query, may replace the logically neutral phrases with a default SAF phrase that is most likely to make the query a processable question. Natural language processing program 110A, 110B may make this determination using analysis based on probabilities extracted from a corpus or using machine learning.

If the modified natural language query contains each of the elements needed to form a processable query, then the query is self-contained, as shown at 212, and no replacement for the removed logically neutral phrases is needed. For example, if the natural language query is "Could you let me know, what is the price of a laptop in Store X," then the remaining query after the removal of the logically neutral phrases is "What is the price of a laptop in Store X." Because this phrase is self-contained and already in the form of a question, the natural language processing program 110A, 110B may not replace the removed logically neutral phrases, leaving the query as is because it has been considered as suitable for processing.

At 216, natural language processing program 110A, 110B has analyzed and modified a received natural language query, and finally provides the modified natural language query to a suitable query processing system. The natural language processing program 110A, 110B may then use the query processing system to further process the modified natural language query into a logical form suitable for transforming the modified natural language query into structured query language (SQL), which may then be used to subsequently query a database.

It may be appreciated that FIGS. 2-3 provide only illustrations of an exemplary implementation and does not imply any limitations with regard to how different embodiments may be implemented. Many modifications to the depicted environments may be made based on design and implementation requirements.

Figure 4:
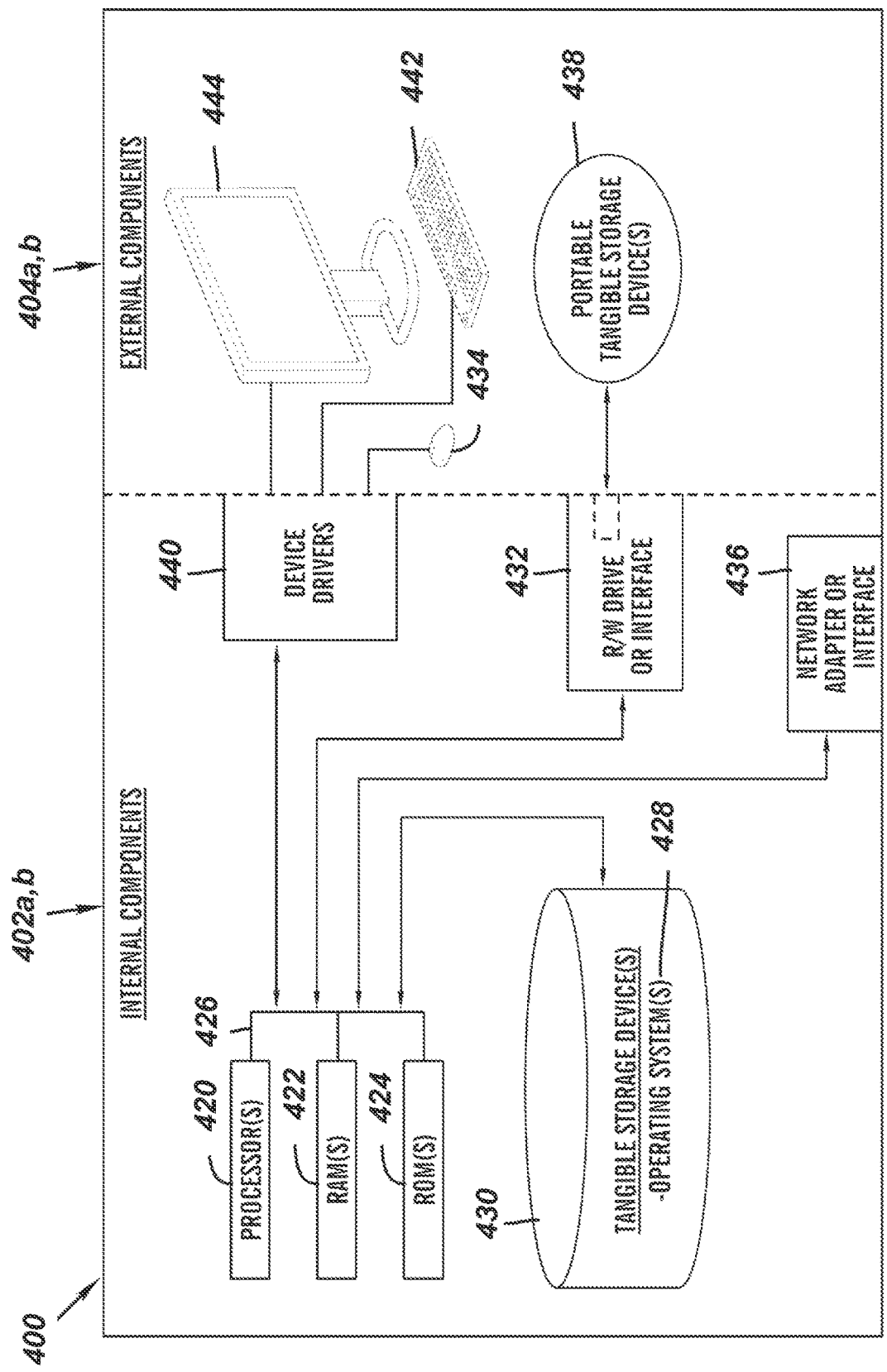
FIG. 4 is a functional block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present disclosure. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402 a,b and external components 404 a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the natural language processing program 110A in the client computing device 102 and the natural language processing program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b also includes a RAY drive or interface 432 to read from and write to one or more portable computer-readable tangible storage devices 438 such as a CD-ROM, DVD, memory stick, magnetic tape, magnetic disk, optical disk or semiconductor storage device. A software program, such as the natural language processing program 110A, 110B, can be stored on one or more of the respective portable computer-readable tangible storage devices 438, read via the respective R/W drive or interface 432, and loaded into the respective hard drive 430.

Each set of internal components 402 a,b also includes network adapters or interfaces 436 such as a TCP/IP adapter cards, wireless Wi-Fi interface cards, or 3G or 4G wireless interface cards or other wired or wireless communication links. The software program 108 and the natural language processing program 110A in the client computing device 102 and the natural language processing program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the natural language processing program 110A in the client computing device 102 and the natural language processing program 110B in the server 112 are loaded into the respective hard drive 430. The network may comprise copper wires, optical fibers, wireless transmission, routers, firewalls, switches, gateway computers and/or edge servers.

Each of the sets of external components 404 a,b can include a computer display monitor 444, a keyboard 442, and a computer mouse 434. External components 404 a,b can also include touch screens, virtual keyboards, touch pads, pointing devices, and other human interface devices. Each of the sets of internal components 402 a,b also includes device drivers 440 to interface to computer display monitor 444, keyboard 442, and computer mouse 434. The device drivers 440, R/W drive or interface 432, and network adapter or interface 436 include hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
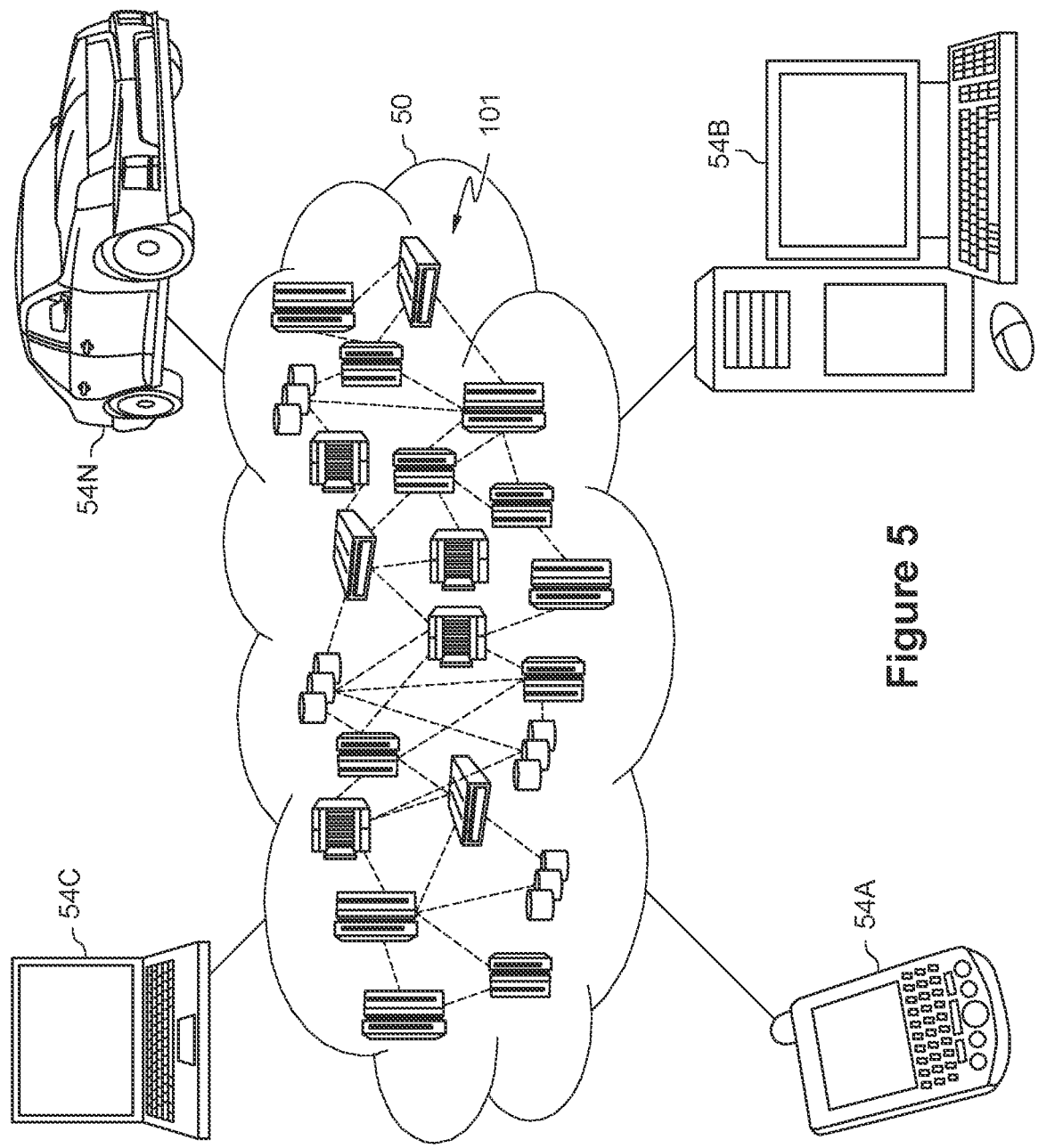
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 101 with which local computing devices used by cloud consumers, such as, for example, personal digital assistant (PDA) or cellular telephone 54A, desktop computer 54B, laptop computer 54C, and/or automobile computer system 54N may communicate. Nodes 101 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
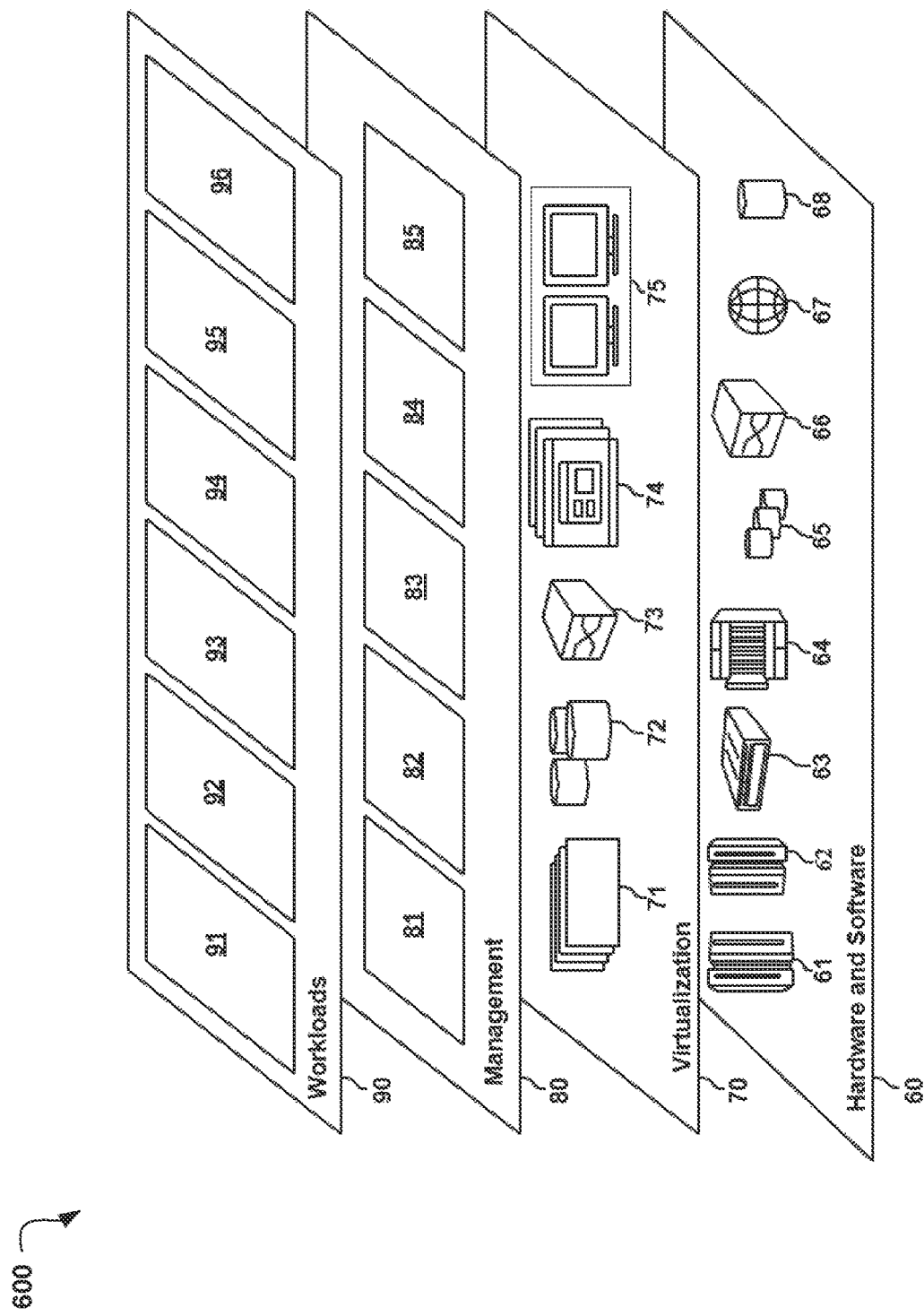
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the present disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and modifying natural language queries to remove and replace logically neutral phrases 96. Modifying natural language queries to remove and replace logically neutral phrases 96 may relate to using semantic and logical relations to analyze a received natural language query to subsequently facilitate modification of that natural language query to improve processability and accuracy of a query.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of identifying and replacing logically neutral phrases in natural language queries, the method comprising:

receiving a natural language query;

automatically identifying one or more logically neutral and non-logically neutral anchors in the natural language query;

automatically identifying boundaries comprising one or more logically neutral phrases by detecting semantic and logical relations between verbal phrases and functional language between and adjacent to the one or more logically neutral and non-logically neutral anchors to reintroduce non-logically neutral language back into a non-logically neutral portion of the natural language query;

generating a modified natural language query by automatically removing the boundaries comprising the one or more logically neutral phrases and optionally replacing the one or more logically neutral phrases in the natural language query; and providing the modified natural language query to a query processing system for further processing.

2. The computer-based method of claim 1, further comprising:

identifying the logically neutral and non-logically neutral anchors by comparing nouns and pronouns included in the received natural language query to a schema annotation file.

3. The computer-based method of claim 2, further comprising:

identifying pronouns in the received natural language query to be further considered to determine whether they are logically neutral or non-logically neutral anchors.

4. The computer-based method of claim 1, wherein automatically removing the boundaries comprising the one or more logically neutral phrases and optionally replacing the one or more logically neutral phrases in the natural language query further comprises:

replacing the removed boundaries including the one or more logically neutral phrases with a word that transforms a remaining portion of the received natural language query into a question.

5. The computer-based method of claim 1, wherein detecting the semantic and logical relations between verbal phrases and functional language between and adjacent to the one or more logically neutral and non-logically neutral anchors further comprises:

detecting the semantic and logical relations between the verbal phrases and the functional language in the boundaries of the one or more logically neutral phrases based on a score-based probability extracted from a corpus.

6. The computer-based method of claim 1, wherein detecting the semantic and logical relations between verbal phrases and functional language between and adjacent to the one or more non-logically neutral anchors further comprises:

determining the semantic and logical relations between the verbal phrases and the functional language in the boundaries of the one or more logically neutral phrases based on a score-based probability extracted from machine learning.

7. The computer-based method of claim 1, further comprising:

using the query processing system to further modify the modified natural language query into a logical form suitable for transforming the modified natural language query into structured query language (SQL).

8. A computer system, the computer system comprising:

one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:

receiving a natural language query;

automatically identifying one or more logically neutral and non-logically neutral anchors in the natural language query;

automatically identifying boundaries comprising one or more logically neutral phrases by detecting semantic and logical relations between verbal phrases and functional language between and adjacent to the one or more logically neutral and non-logically neutral anchors to reintroduce non-logically neutral language back into a non-logically neutral portion of the natural language query;

generating a modified natural language query by automatically removing the boundaries comprising the one or more logically neutral phrases and optionally replacing the one or more logically neutral phrases in the natural language query; and providing the modified natural language query to a query processing system for further processing.

9. The computer system of claim 8, further comprising:

identifying the logically neutral and non-logically neutral anchors by comparing nouns and pronouns included in the received natural language query to a schema annotation file.

10. The computer system of claim 9, further comprising:

identifying pronouns in the received natural language query to be further considered to determine whether they are logically neutral or non-logically neutral anchors.

11. The computer system of claim 10, wherein automatically removing the boundaries comprising the one or more logically neutral phrases and optionally replacing the one or more logically neutral phrases in the natural language query further comprises:

replacing the removed boundaries including the one or more logically neutral phrases with a word that transforms a remaining portion of the received natural language query into a question.

12. The computer system of claim 8, wherein detecting the semantic and logical relations between verbal phrases and functional language between and adjacent to the one or more logically neutral and non-logically neutral anchors further comprises:

detecting the semantic and logical relations between the verbal phrases and the functional language in the boundaries of the one or more logically neutral phrases based on a score-based probability extracted from a corpus.

13. The computer system of claim 8, wherein detecting the semantic and logical relations between verbal phrases and functional language between and adjacent to the one or more non-logically neutral anchors further comprises:

determining the semantic and logical relations between the verbal phrases and the functional language in the boundaries of the one or more logically neutral phrases based on a score-based probability extracted from machine learning.

14. The computer system of claim 8, further comprising:

using the query processing system to further modify the modified natural language query into a logical form suitable for transforming the modified natural language query into structured query language (SQL).

15. A computer program product, the computer program product comprising:

one or more computer-readable tangible storage medium and program instructions stored on at least one of the one or more computer-readable tangible storage medium, the program instructions executable by a processor capable of performing a method, the method comprising:

receiving a natural language query;

automatically identifying one or more logically neutral and non-logically neutral anchors in the natural language query;

automatically identifying boundaries comprising one or more logically neutral phrases by detecting semantic and logical relations between verbal phrases and functional language between and adjacent to the one or more logically neutral and non-logically neutral anchors to reintroduce non-logically neutral language back into a non-logically neutral portion of the natural language query;

generating a modified natural language query by automatically removing the boundaries comprising the one or more logically neutral phrases and optionally replacing the one or more logically neutral phrases in the natural language query; and providing the modified natural language query to a query processing system for further processing.

16. The computer program product of claim 15, further comprising:

identifying the logically neutral and non-logically neutral anchors by comparing nouns and pronouns included in the received natural language query to a schema annotation file.

17. The computer program product of claim 15, further comprising:

identifying pronouns in the received natural language query to be further considered to determine whether they are logically neutral or non-logically neutral anchors.

18. The computer program product of claim 16, wherein automatically removing the boundaries comprising the one or more logically neutral phrases and optionally replacing the one or more logically neutral phrases in the natural language query further comprises:

replacing the removed boundaries including the one or more logically neutral phrases with a word that transforms a remaining portion of the received natural language query into a question.

19. The computer program product of claim 15, wherein detecting the semantic and logical relations between verbal phrases and functional language between and adjacent to the one or more logically neutral and non-logically neutral anchors further comprises:

detecting the semantic and logical relations between the verbal phrases and the functional language in the boundaries of the one or more logically neutral phrases based on a score-based probability extracted from a corpus.

20. The computer program product of claim 15, further comprising using the query processing system to further modify the modified natural language query into a logical form suitable for transforming the modified natural language query into structured query language (SQL).

* * * * *